United States Patent
Thrun et al.

(10) Patent No.: US 10,009,963 B1
(45) Date of Patent: Jun. 26, 2018

(54) DECODING A CUSTOM COOKING PROGRAM

(71) Applicant: Silicon Valley Factory LLC, Los Altos Hills, CA (US)

(72) Inventors: Sebastian Thrun, Los Altos, CA (US); David St. Martin, San Rafael, CA (US); Arash Kani, Roxbury, MA (US)

(73) Assignee: Silicon Valley Factory LLC, Los Altos Hills, CA (US)

( * ) Notice: Subject to any disclaimer, the term of this patent is extended or adjusted under 35 U.S.C. 154(b) by 0 days. days.

(21) Appl. No.: 15/489,476

(22) Filed: Apr. 17, 2017

(51) Int. Cl.
- *H05B 6/64* (2006.01)
- *H05B 1/02* (2006.01)
- *G05D 23/20* (2006.01)
- *G06K 7/10* (2006.01)

(52) U.S. Cl.
CPC ....... *H05B 6/6447* (2013.01); *G06K 7/10366* (2013.01); *H05B 6/6467* (2013.01)

(58) Field of Classification Search
CPC ........ G06Q 50/12; H05B 6/688; H05B 6/687; G05B 15/02; H04L 67/12
USPC ....... 219/705, 506, 679, 494, 412, 492, 682, 219/708, 497, 714, 680, 681; 99/342, 99/421 H, 325, 332, 326, 329, 333
See application file for complete search history.

(56) References Cited

U.S. PATENT DOCUMENTS

| | | | |
|---|---|---|---|
| 3,530,499 A | 9/1970 | Schroeder | |
| 4,323,773 A | 4/1982 | Carpenter | |
| 4,381,438 A | 4/1983 | Goessler | |
| 4,749,836 A | 6/1988 | Matsuo et al. | |
| 4,913,038 A | 4/1990 | Burkett | |
| 5,045,333 A | 9/1991 | Petrofsky | |
| 5,877,477 A | 3/1999 | Petty | |
| 6,660,983 B2 | 12/2003 | Monforton | |
| 6,740,855 B1 | 5/2004 | Decobert | |
| 8,191,465 B2 | 6/2012 | Sager | |
| 8,207,479 B2 | 6/2012 | Ben-Shmuel | |
| 8,835,816 B2 * | 9/2014 | McIntyre | G06Q 50/12 219/412 |
| 9,414,442 B2 | 8/2016 | Torres | |
| 9,528,972 B2 | 12/2016 | Minvielle | |
| 9,606,522 B2 | 3/2017 | Hoffman | |
| 9,644,847 B2 | 5/2017 | Bhogal | |
| 2007/0092670 A1 | 4/2007 | Quella | |
| 2007/0137633 A1 | 6/2007 | McFadden | |
| 2007/0278221 A1 | 12/2007 | Skaife | |

(Continued)

FOREIGN PATENT DOCUMENTS

| | | |
|---|---|---|
| EP | 1422163 | 5/2004 |
| JP | 2006153432 | 6/2006 |

OTHER PUBLICATIONS

RF Solid-State Technology with Goji. http://www.gojifoodsolutions.com/rf-cooking-technology. Jan. 29, 2017.

(Continued)

*Primary Examiner* — Quang Van
(74) *Attorney, Agent, or Firm* — Van Pelt, Yi & James LLP

(57) ABSTRACT

In various embodiments, a method of decoding a custom cooking program includes using a tag reader to read heating instruction data encoded in an electronic tag, determining heating phases based on the read heating instruction data, and automatically controlling a heating apparatus to execute the determined heating phases.

19 Claims, 8 Drawing Sheets

(56) References Cited

U.S. PATENT DOCUMENTS

| | | |
|---|---|---|
| 2008/0083338 A1 | 4/2008 | Niemetz |
| 2008/0105134 A1 | 5/2008 | Elston, III |
| 2008/0108388 A1 | 5/2008 | Ebrom |
| 2009/0188396 A1* | 7/2009 | Hofmann ............... G01K 1/024 99/342 |
| 2009/0194526 A1 | 8/2009 | Buchanan |
| 2009/0208615 A1 | 8/2009 | Domingues |
| 2009/0236334 A1 | 9/2009 | Ben-Shmuel |
| 2010/0213187 A1* | 8/2010 | Bandholz ............. H05B 6/6441 219/506 |
| 2010/0320189 A1 | 12/2010 | Buchheit |
| 2011/0303652 A1 | 12/2011 | Sano |
| 2012/0063753 A1 | 3/2012 | Cochran |
| 2013/0092032 A1 | 4/2013 | Cafferty |
| 2013/0269539 A1 | 10/2013 | Polt |
| 2013/0306627 A1 | 11/2013 | Libman |
| 2014/0263640 A1 | 9/2014 | Heit |
| 2014/0377417 A1 | 12/2014 | Martinez |
| 2015/0057773 A1 | 2/2015 | Minvielle |
| 2016/0198885 A1 | 7/2016 | Logan |
| 2016/0220064 A1 | 8/2016 | Young |
| 2016/0295640 A1 | 10/2016 | De Samber |
| 2016/0327279 A1 | 11/2016 | Bhogal |
| 2016/0355287 A1 | 12/2016 | Keller |
| 2017/0016623 A1 | 1/2017 | Rabie |
| 2017/0135383 A1 | 5/2017 | Liss |

OTHER PUBLICATIONS

Author Unknown, "Induction Heating", from Wikipedia, the free encyclopedia. Last modified Jan. 10, 2017.

Butz et al., "Recent Developments in Noninvasive Techniques for Fresh Fruit and Vegetable Internal Quality Analysis", from R: Concise Reviews in Food Science, published Nov. 21, 2005.

Translation of JP2006153432A, Nozawa et al, Heating Cooker Information medium and program, Jun. 15, 2006, ProQuest, Mar. 25, 2018.

* cited by examiner

100

200

500

530

550

600

800

1100

1000

1200

1250

DECODING A CUSTOM COOKING PROGRAM

BACKGROUND OF THE INVENTION

There are many challenges in food preparation. Cooking can be time-consuming and messy. For example, ingredient selection, acquisition, transportation, and preparation can be inconvenient. In spite of the effort expended, sometimes the results of meal preparation are unsatisfying. Successfully extracting flavors from ingredients typically requires lengthy cooking processes such as stewing or skilled processes such as browning. The final tastiness of food depends on the characteristics of the ingredients and a person's tastes and preferences.

Pre-packaged chilled convenience meals have been popular since the 1950s for its ease of preparation. Typical convenience meals are packaged in a tray and frozen. The consumer heats the meal in an oven or microwave and consumes the food directly from the tray. However, conventional pre-packaged convenience meals might be unhealthy and not tasty, and results may vary depending on the microwave or oven used to heat the meal. For example, the food might be heated unevenly.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A method of decoding of a custom cooking program is disclosed. In various embodiments, the method includes using a tag reader to read heating instruction data encoded in an electronic tag. Heating phases are determined based on the read heating instruction data. A heating apparatus is automatically controlled to execute the determined heating phases.

Figure 1:
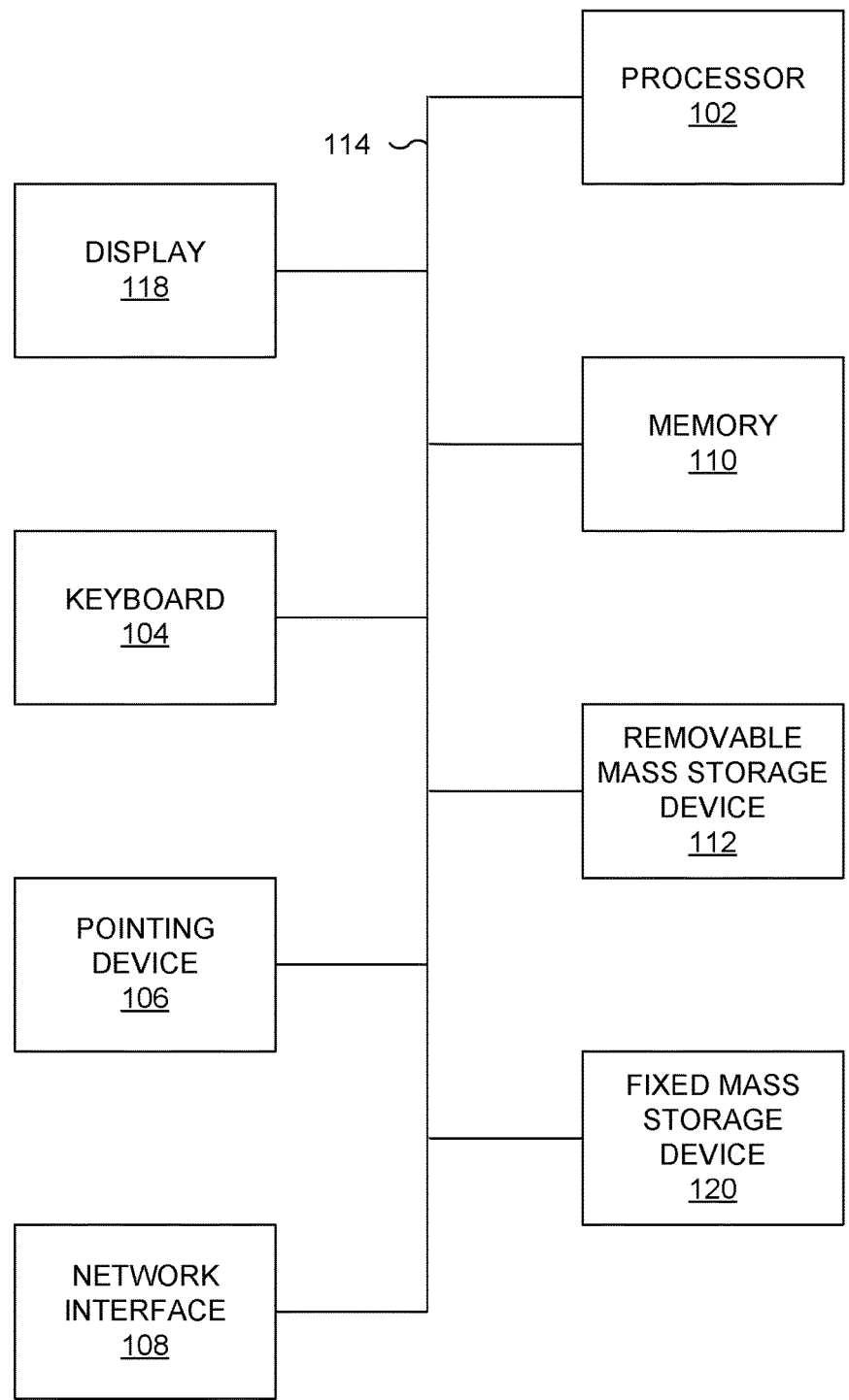
FIG. 1 is a functional diagram illustrating a programmed computer system for decoding a custom cooking program in accordance with some embodiments.

FIG. 1 is a functional diagram illustrating a programmed computer system for decoding a custom cooking program in accordance with some embodiments. As will be apparent, other computer system architectures and configurations can be used to decode a custom cooking program. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 includes and/or is used to execute/perform the processes described below with respect to FIGS. 2, 6, and 11.

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data and objects used by the processor 102 to perform its functions (e.g., programmed instructions). For example, memory 110 can include any suitable computer-readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storage 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
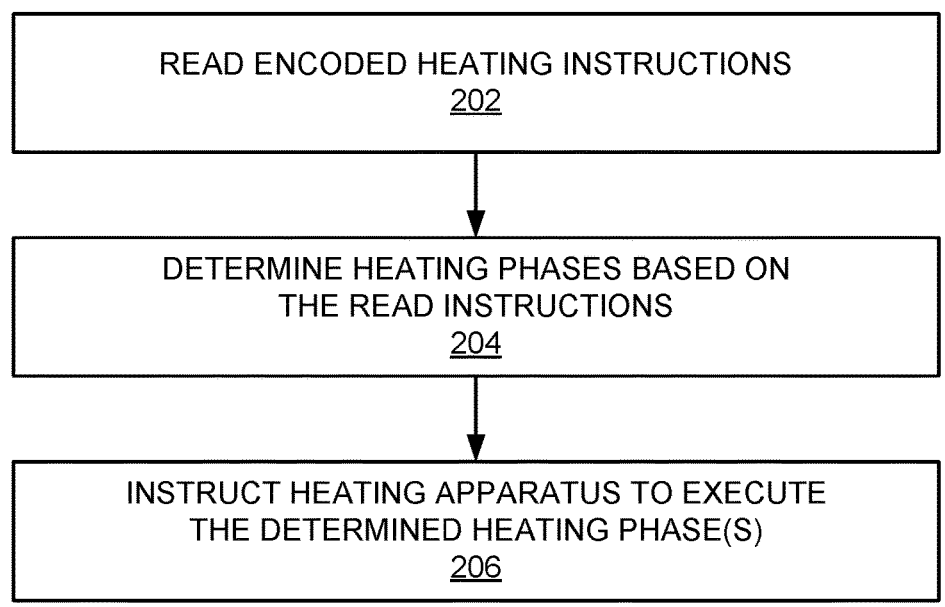
FIG. 2 is a flowchart illustrating an embodiment of a process to decode a custom cooking program.

FIG. 2 is a flowchart illustrating an embodiment of a process 200 to decode a custom cooking program. In various embodiments, the custom cooking program is adapted for contents of a package such as contents of package 800 of FIG. 8. In various embodiments, the process 200 may be implemented by a processor such as processor 102 of FIG. 1, controller 908 of FIG. 9, or controller 1008 of FIG. 10.

At 202, encoded heating instructions are read. In some embodiments, the instructions are obtained from reading an electronic tag. For example, in various embodiments, an electronic tag reader such as reader 906 of FIG. 9 scans an electronic tag 824 of FIG. 8.

In some embodiments, heating instructions are embedded in the electronic tag and an Internet connection is not needed to prepare food using the heating instructions. In some embodiments, instructions are requested from a remote server based on an identification of the packaged food. The identification of the packaged food may be determined by scanning an electronic tag such as tag 824 of FIG. 8.

At 204, heating phases are determined based on the read heating instructions. The instructions may include a heating schedule having one or more phases. In various embodiments, each phase is characterized by a duration and/or an energy level. For example, the heating instructions may be provided as a recipe or schedule in which the food is heated at a particular temperature/energy level for a defined duration of time. Examples of a heating schedules are shown in FIGS. 3 and 4.

At 206, a heating apparatus is instructed to execute the determined heating phases. In various embodiments, an electromagnetic (EM) source is instructed to energize at a specific time to carry out the heating phases. For example, EM source 902 may be energized at an appropriate frequency and time to effect the pre-defined energy level for a pre-defined duration for a phase as further described herein with respect to FIG. 9. In various embodiments, typical recipes are completed within three minutes and may include one or more phases.

In various embodiments, a heating apparatus that is part of a system of a plurality of heating apparatus is instructed to execute the determined heating phases in a coordinated manner. For example, the heating apparatus may delay beginning of a first heating phase such that the heating process ends at substantially the same time as another heating apparatus. As another example, the heating apparatus may delay beginning of a first heating phase such that the heating apparatus ends at a pre-defined time before or after at least one other heating apparatus. An example of a cooking system with a plurality of cooking modules is further described herein with respect to FIGS. 12A and 12B. Corresponding heating schedules are described herein with respect to FIGS. 5A, 5B, and 5C.

Figure 3:
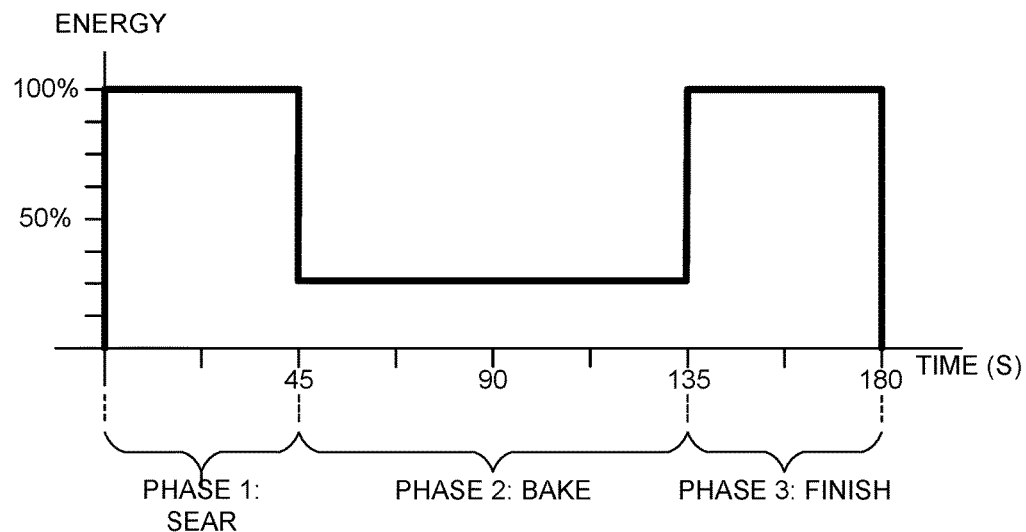
FIG. 3 is a block diagram illustrating an embodiment of a heating schedule.
Figure 4:
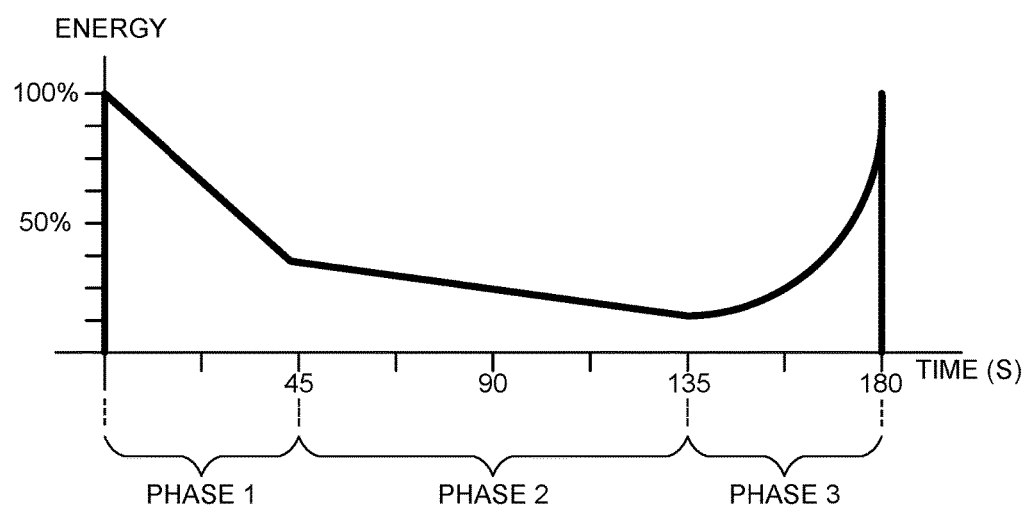
FIG. 4 is a block diagram illustrating an embodiment of a heating schedule.

FIG. 3 is a block diagram illustrating an embodiment of a heating schedule. The cooking schedule may be determined by decoding a custom cooking program. In this example, the cooking schedule is represented by a graph, wherein the x-axis is time in seconds and the y-axis is energy level. The energy level is given by the energy that a heating apparatus is capable of providing, e.g., field per unit volume of the material being heated up, heat per unit volume of material, temperature, etc. This example cooking schedule takes three minutes and includes three phases: first searing at 100% energy for 45 seconds, then baking at 25% energy for 90 seconds, and finally finishing at 100% energy for 45 seconds.

FIG. 4 is a block diagram illustrating an embodiment of a heating schedule. The cooking schedule may be determined by decoding a custom cooking program. In this example, the cooking schedule is represented by a graph, wherein the x-axis is time in seconds and the y-axis is energy level. The energy level is given by the energy that a heating apparatus is capable of providing, e.g., field per unit volume of the material being heated up, heat per unit volume of material, temperature.

The example of FIG. 4 illustrates that an energy level during a phase need not be uniform. In this example, in phase 1, energy is linearly decreased from 100% to around 27%. In phase 2, energy is linearly decreased from around 27% to around 12.5%. In phase 3, energy is exponentially increased from around 12.5% to 100%.

Figure 5A:
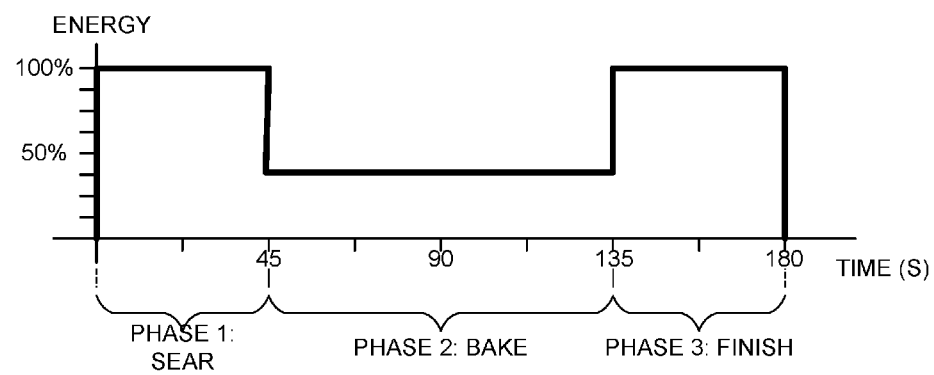
FIG. 5A is a block diagram illustrating an embodiment of a heating schedule for a first heating apparatus.
Figure 5B:
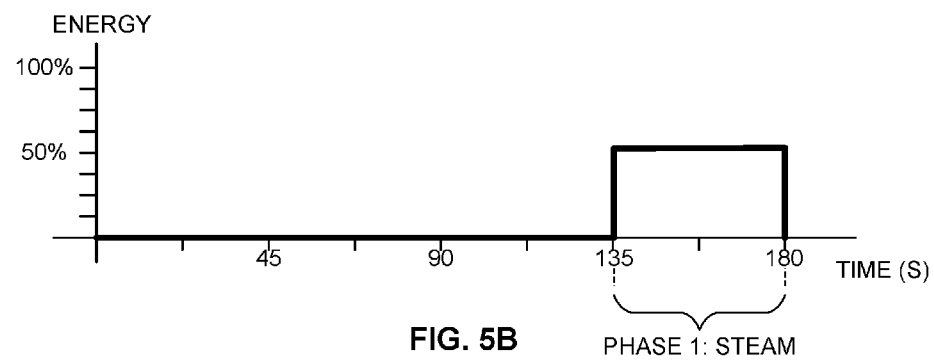
FIG. 5B is a block diagram illustrating an embodiment of a heating schedule for a second heating apparatus.
Figure 5C:
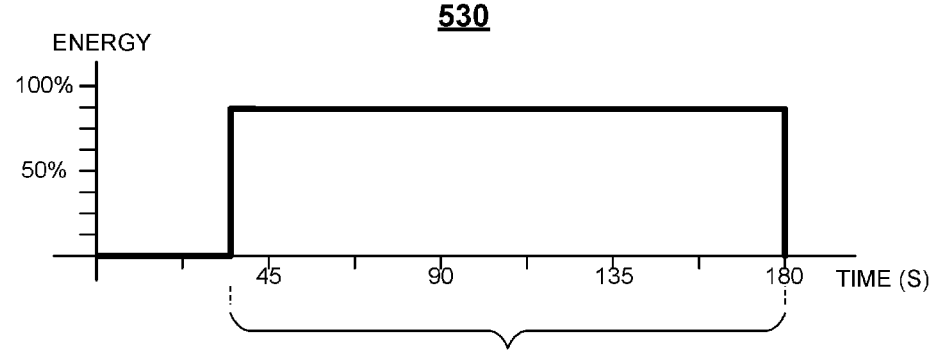
FIG. 5C is a block diagram illustrating an embodiment of a heating schedule for a third heating apparatus.
Figure 12A:
FIG. 12A is a block diagram illustrating an embodiment of a modular cooking system.

In various embodiments, a plurality of heating apparatus may be coordinated to prepare a meal with multiple dishes. FIG. 5A is a block diagram illustrating an embodiment of a heating schedule 500 for a first heating apparatus. FIG. 5B is a block diagram illustrating an embodiment of a heating schedule 530 for a second heating apparatus. FIG. 5C is a block diagram illustrating an embodiment of a heating schedule 550 for a third heating apparatus. Heating schedules 500, 530, 500 may be determined by decoding one or more custom cooking programs. Referring to FIG. 12A, heating schedule 500 may be determined from a food package corresponding to Device 1, heating schedule 530 may be determined from a food package corresponding to Device 2, and heating schedule 550 may be determined from a good package corresponding to Device N. Examples of multi-unit systems are further described herein with respect to FIGS. 12A and 12B.

Returning to FIGS. 5A, 5B, and 5C, the heating schedules shown in each of the figures is an example of meal preparation of three different dishes. Suppose heating schedule 500 is for steak, which takes 3 minutes to cook; heating schedule 530 is for spinach, which takes 1 minute to cook; and heating schedule 550 is for mashed potatoes, which takes 2.5 minutes to cook.

The dishes can be coordinated to finish cooking at the same time as follows. Heating schedule 500 begins Phase 1 (searing) in which steak is seared at 100% energy for 45 seconds. At this time, according to each of heating schedules 530 and 550, heating has not yet begun (energy is at 0%). At 45 seconds, heating schedule 500 begins Phase 2 (baking) in which the steak is baked at approximately 25% energy for approximately 90 seconds. At 135 seconds, heating schedule 500 begins Phase 3 (finishing) in which the steak is heated at approximately 100% energy for approximately 45 seconds.

Approximately 35 seconds after heating schedule 500 began, heating schedule 550 enters Phase 1 (baking) in which mashed potatoes are baked at approximately 87.5% energy for approximately 145 seconds. Approximately 100 seconds after heating schedule 500 began, heating schedule 530 enters Phase 1 (steaming) in which spinach is steamed at approximately 50% energy for 45 seconds. In this example, heating schedules 500, 530, and 550 will complete cooking at around the same time.

As another example, heating schedules may be coordinated to finish cooking at staggered times. Using the same example in which heating schedule 500 is for steak, heating schedule 530 is for spinach, and heating schedule 550 is for mashed potatoes, suppose spinach needs more time to cool down. Heating schedules 500 and 550 may be adapted to finish at the same time, and heating schedule 530 may be adapted to finish 60 seconds before heating schedules 500 and 550. Heating schedules 500 and 550 may proceed as shown in FIGS. 5A and 5B. Heating schedule 530 may delay until 75 seconds after heating schedule 500 began to begin. That is, heating schedule 530 begins 60 seconds earlier than the example shown in FIG. 5B. This would result in heating schedule 530 completing 60 seconds before heating schedule 500 and 550 complete.

Figure 6:
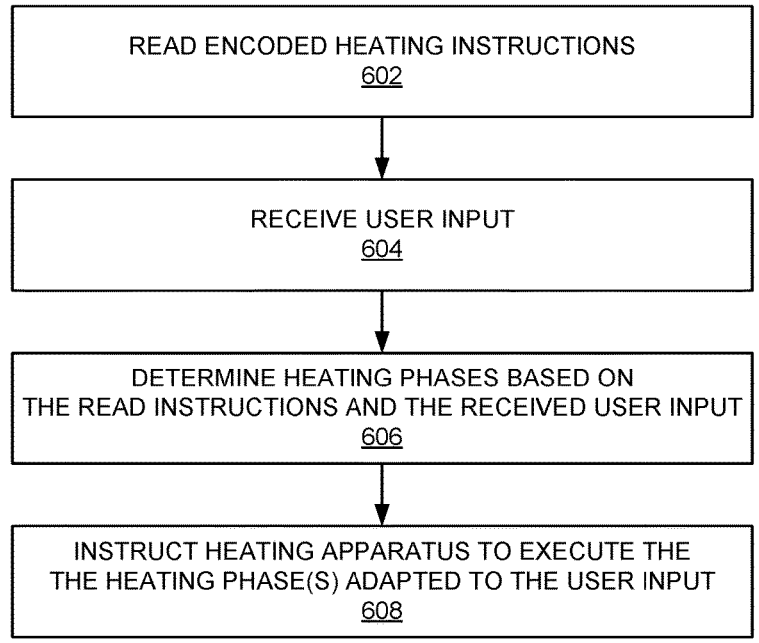
FIG. 6 is a flowchart illustrating an embodiment of a process to decode a custom cooking program.

FIG. 6 is a flowchart illustrating an embodiment of a process 600 to decode a custom cooking program. In various embodiments, the custom cooking program is adapted for contents of a package such as matter 830 of FIG. 8. In various embodiments, the process 600 may be implemented by a processor such as processor 102 of FIG. 1, controller 908 of FIG. 9, or controller 1008 of FIG. 10.

At 602, encoded heating instructions are read. An example of reading encoded heating instructions is 202 of process 200 of FIG. 2.

At 604, user input is received. The user input may be received on a user interface such as a touch screen. For example, various options for food preparation may be displayed on the touch screen. One or more options may be selected via the user interface. Using the example of steak, the user is provided with options such as: rare, medium, medium well, and well. Using the example of pasta, the user is provided with options such as: al dente, softer, softest. The options may be provided as multi-choice, a linear scale, among others. In response to user selection of the preparation option, the controller adjusts a heating schedule to produce the desired result.

Figure 9:
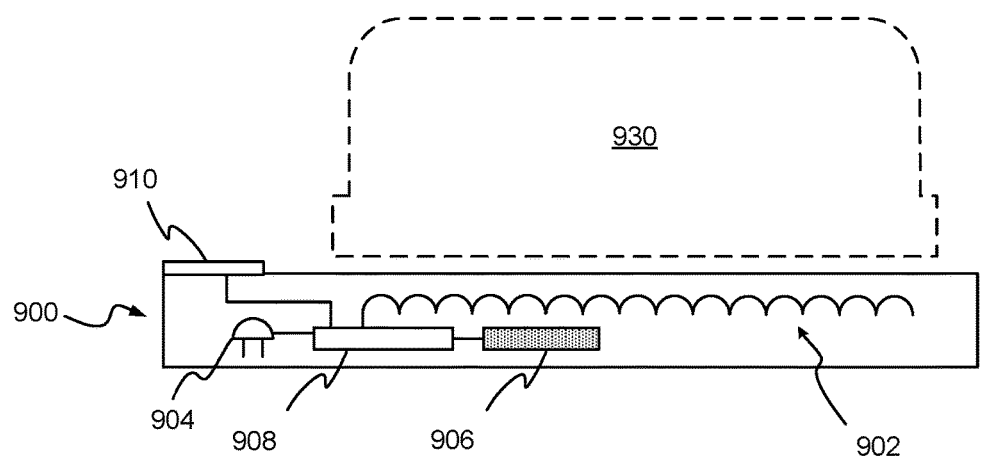
FIG. 9 is a block diagram illustrating an embodiment of an apparatus for heating.

In various embodiments, the user interface is a touch screen provided on a heating apparatus such as the user interface 910 of FIG. 9. In various embodiments, the user interface is provided in a phone application. User selections may be transmitted by the phone application to a processor executing process 600. Feedback for the user may be transmitted by the process executing process 600 to the user via phone app.

At 606, heating phases are determined based on the read instructions and the received user input. The instructions may include a heating schedule having one or more phases. In various embodiments, each phase is characterized by a duration and/or an energy level. For example, the heating instructions may be provided as a recipe or schedule in which the food is heated at a particular temperature/energy level for a defined duration of time.

In various embodiments, the duration and/or an energy level for a phase may be adjusted based on the user input. In some cases, one or more phases may be added or removed based on the user input. Suppose a user indicates that she prefers her steak rare. The heating phases may be assembled based on a baseline heating schedule. To customize the steak to the user's tastes (rare), one or more phases may be shortened and/or an energy level for one or more phases may be decreased by a pre-defined percentage, e.g., 10%. An example of an adjusted heating schedule is shown in FIG. 7.

At 608, a heating apparatus is instructed to execute the heating phases adapted to the user input. An example of instructing a heating apparatus to execute heating phases is 206 of process 200 of FIG. 2.

Figure 7:
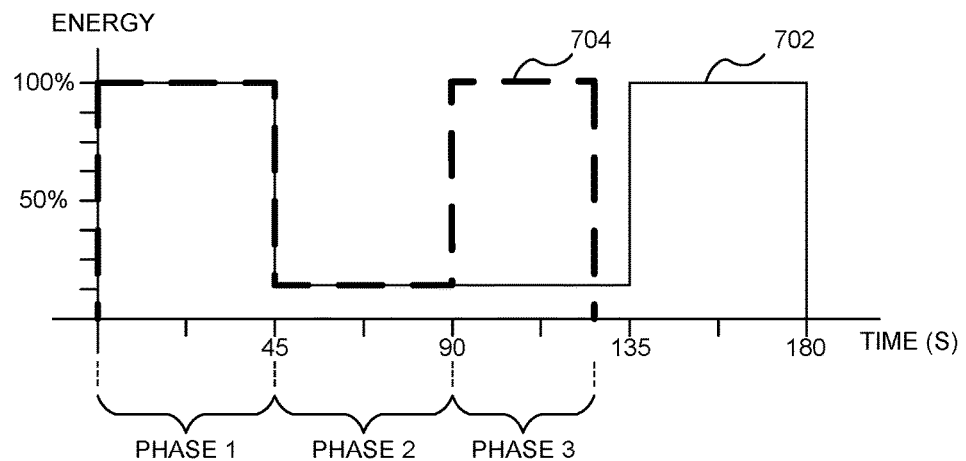
FIG. 7 is a block diagram illustrating an embodiment of a heating schedule adapted based on user input.

FIG. 7 is a block diagram illustrating an embodiment of a heating schedule adapted based on user input. The cooking schedule may be determined by decoding a custom cooking program. In this example, the cooking schedule is represented by a graph, where the x-axis is time in seconds and the y-axis is energy level. The energy level is given by the energy that a heating apparatus is capable of providing, e.g., field per unit volume of the material being heated up, heat per unit volume of material, temperature.

The example of FIG. 7 includes a baseline/default heating schedule 702 and an adapted heating schedule 704. The adapted heating schedule 704 may be generated based on user input. Referring to the example of a user who prefers steak rare, the heating schedule 704 is generated by reducing Phase 2 relative to the baseline schedule 702. Here, Phase 2 is shortened to 45 seconds and Phase 3 is shortened to approximately 68 seconds. Compared with the baseline heating schedule 702 (e.g., for medium well steak), the adapted heating schedule 704 finishes approximately 68 seconds earlier.

Although not shown, there may be other schedule adaptations that would achieve a similar effect. For example, a heating energy level may be reduced instead of or in conjunction with phase duration changes. In various embodiments, the adaptations are selected based on pre-defined user preferences such as shortest cooking time, best taste, etc. In various embodiments, the adaptations are coordinated with other heating schedules. For example, if a meal with several dishes is being prepared, schedules may be adapted to be completed at the same time or staggered times. To achieve the desired coordinated finish times, the energy levels rather than the cooking times may be adapted from the baseline heating schedules.

Figure 8:
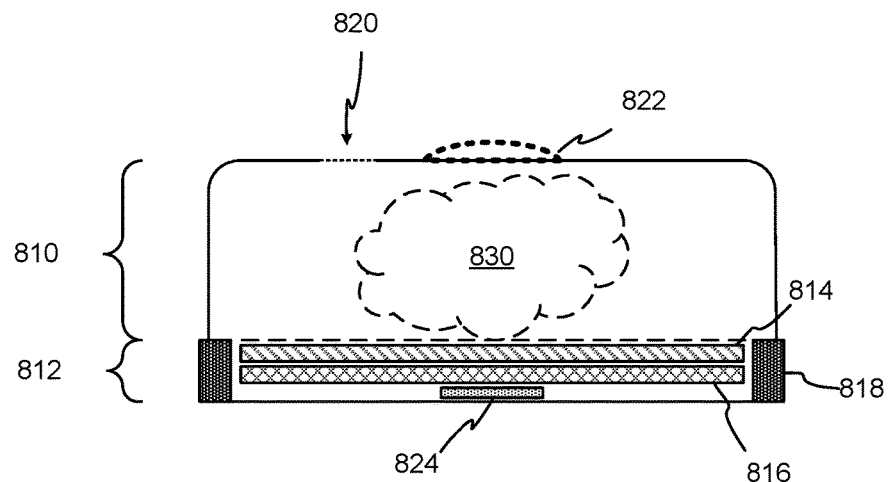
FIG. 8 is a block diagram illustrating an embodiment of an apparatus to store and transport matter.

FIG. 8 is a block diagram illustrating an embodiment of an apparatus 800 to store and transport matter 830. For example, in various embodiments the apparatus 800 is adapted to store and transport matter 830 comprising food or other heatable loads. The apparatus 800 includes a top portion 810, a bottom portion 812, a metal layer 814, a membrane 816, a seal 818, and a pressure relief valve 820.

The bottom portion 812 is adapted to receive matter 830. The bottom portion holds food or other types of loads. For example, the bottom portion may be a plate or bowl. As further described herein, a user may directly consume the matter 830 from the bottom portion 812.

The top portion 810 is adapted to fit the bottom portion 812 to form a chamber. For example, the top portion may be a cover for the bottom portion. In some embodiments, the top portion is deeper than the bottom portion and is a dome, cloche, or other shape. Although not shown, in some embodiments, the top portion is shallower than the bottom portion. In some embodiments, the top portion is transparent and the matter 830 can be observed during a preparation/heating process. In some embodiments, the chamber is at least partially opaque. For example, portions of the chamber may be opaque to prevent users from inadvertently touching the apparatus when the chamber is hot.

The top portion 810 and the bottom portion 812 may be made of a variety of materials. Materials may include glass, plastic, metal, compostable/fiber-based materials, or a combination of materials. The top portion 810 and the bottom portion 812 may be made of the same material or different materials. For example, the top portion 810 is metal while the bottom portion 812 is another material.

The seal 818 is adapted to join the top portion 810 to the bottom portion 812. In one aspect, the seal may provide an air-tight connection between the top portion and the bottom portion, defining a space enclosed within the top portion and the bottom portion. In some embodiments, in the space, matter 830 is isolated from an outside environment. The pressure inside the space may be different from atmospheric pressure. The seal may also prevent leakage and facilitate pressure buildup within the chamber in conjunction with pressure relief valve 820 and/or clamp of a heating apparatus (not shown).

In one aspect, a chamber formed by the top portion 810 and the bottom portion 812 may store and/or preserve food. For example, food may be vacuum-sealed inside the chamber. In another aspect, the chamber contains the food during a heating process. In various embodiments, the chamber can be directly be placed on a heating apparatus. For example, a user may obtain the chamber from a distributor (e.g., a grocery store), heat up the contents of the chamber without opening the chamber, and consume the contents of the chamber directly. In various embodiments, the same chamber stores/preserves food, is a transport vessel for the food, can be used to cook the food, and the food can be directly consumed from the chamber after preparation.

The metal layer 814 (also referred to as a conductive structure) heats in response to an EM source. In some embodiments, the metal layer heats by electromagnetic induction. The metal layer can heat matter 830. For example, heat in the metal layer may be conducted to the contents. As further described herein, the heating of the matter (in some cases in combination with a controlled level of moisture) in the chamber allows for a variety of preparation methods including dry heat methods such as baking/roasting, broiling, grilling, sauteing/frying; moist heat methods such as steaming, poaching/simmering, boiling; and combination methods such as braising and stewing. In various embodiments, several different heating methods are used in a single preparation process, e.g., the preparation process comprising a sequence of heating cycles.

The metal layer may be made of a variety of materials. In some embodiments, the metal layer includes an electrically conducting material such as a ferromagnetic metal, e.g., stainless steel. In various embodiments, the metal is processed and/or treated in various ways. For example, in some embodiments, the metal is ceramic-coated. In some embodiments, the metal layer is made of any metallic material, e.g., aluminum.

The membrane 816 (also referred to as a membrane region) is adapted to control an amount of liquid. For example, the membrane may provide controlled flow of moisture through the membrane. In various embodiments, the membrane may release liquids (e.g., water) inside a space defined by the top portion 810 and the bottom portion 812. For example, water can be released in a controlled manner and transformed to steam during a heating process. In various embodiments, the membrane may absorb liquids. For example, the membrane may absorb juices released by food during a heating process.

In some embodiments, the membrane 816 is adapted to provide insulation between the metal layer 814 and a surface of the bottom portion 812. For example, if the bottom portion is a glass plate, the membrane may prevent the glass plate from breaking due to heat.

The membrane 816 may be made of a variety of materials. In some embodiments, the membrane includes a heat-resistant spongy material such as open-cell silicone. In some embodiments, the membrane includes natural fiber and/or cellulose. The material may be selected based on desired performance, e.g., if the membrane is intended to absorb liquid or release liquid, a rate at which liquid should be absorbed/released, a quantity of liquid initially injected in the membrane, etc.

The pressure relief valve 820 regulates pressure in a space defined by the top portion 810 and the bottom portion 812. In various embodiments, the pressure relief valve relieves pressure buildup within the chamber. For example, in various embodiments the valve activates/deploys automatically in response to sensed temperature or pressure inside the chamber meeting a threshold. In some embodiments, the valve is activated by a heating apparatus such as heating apparatus 900 of FIG. 9. For example, the valve may be activated at a particular stage or time during a cooking process. The pressure relief valve allows the contents of the chamber to be heated at one or more pre-determined pressures including at atmospheric pressure. In various embodiments, this accommodates pressure heating techniques.

In some embodiments, the apparatus includes a handle 822. The handle may facilitate handling and transport of the apparatus. For example, the handle may enable a user to remove the apparatus from a base (e.g., from the heating apparatus 900 of FIG. 9). In various embodiments, the handle is insulated to allow safe handling of the apparatus when the rest of the apparatus is hot. In some embodiments, the handle is collapsible such that the apparatus is easily stored. For example, several apparatus may be stacked. FIG. 8 shows one example of the handle placement. The handle may be provided in other positions or locations.

In some embodiments, the apparatus includes an electronic tag 824. The electronic tag encodes information about the apparatus. By way of non-limiting example, the encoded information includes identification of matter 830, characteristics of the contents, and handling instructions. Using the example of a food package, the electronic tag may store information about the type of food inside the package (e.g., steak, fish, vegetables), characteristics of the food (e.g., age/freshness, texture, any abnormalities), and cooking instructions (e.g., sear the steak at high heat followed by baking at a lower temperature). Although shown below membrane 816, the electronic tag may be provided in other locations such as below handle 822, on a wall of the top portion 810, among other places.

The apparatus 800 may be a variety of shapes and sizes. In some embodiments, the shape of the apparatus is compatible with a heating apparatus such as heating apparatus 900 of FIG. 9. For example, the apparatus may be of a suitable surface area and shape to be heated by apparatus 900. For example, apparatus 800 may be around 7 inches in diameter and around 2 inches in height.

FIG. 9 is a block diagram illustrating an embodiment of an apparatus 900 for heating. For example, in various embodiments the heating apparatus 900 is adapted to receive an apparatus 930 (also referred to as a chamber) and heat contents of the chamber 930. An example of the chamber 930 is apparatus 800 of FIG. 8. The heating apparatus 900 includes an EM source 902, one or more sensors 904, electronic tag reader 906, controller 908, and user interface 910.

The EM source 902 heats electrically conductive materials. In various embodiments, the EM source is an RF source that provides inductive heating of metals such as ferromagnetic or ferrimagnetic metals. For example, the EM source 902 may include an electromagnet and an electronic oscillator. In some embodiments, the oscillator is controlled by controller 908 to pass an alternating current (AC) through an electromagnet. The alternating magnetic field generates eddy currents in a target such as metal layer 814 of FIG. 8, causing the metal layer to heat. Heating levels and patterns may be controlled by the frequency of the AC and when to apply the AC to the electromagnet as further described herein.

The sensor(s) 904 are adapted to detect characteristics of contents of chamber 930 including any changes that may occur during a heating process. A variety of sensors may be provided including a microphone, camera, thermometer, and/or hygrometer, etc. A microphone may be configured to detect sounds of the matter being heated. A camera may be configured to detect changes in the appearance of the matter being heated, e.g., by capturing images of the matter. A hygrometer may be configured to detect steam/vapor content of the chamber. For example, the hygrometer may be provided near an opening or pressure relief valve such as valve 120 of FIG. 1 to detect moisture escaping the chamber. The information captured by the sensors may be processed by controller 908 to determine a stage in the cooking process or a characteristic of the matter being heated as further described herein. In this example, the sensor(s) are shown outside the chamber 930. In some embodiments, at least some of the sensor(s) are provided inside the chamber 930.

The electronic tag reader 906 reads information about contents of the chamber 930 such as characteristics of packaged food. The information encoded in the tag may include properties of the contents, instructions for preparing/heating the contents, etc. In various embodiments, the electronic tag reader is configured to read a variety of tag types including barcodes, QR codes, RFIDs and any other tags encoding information.

The controller 908 controls operation of the heating apparatus 900. An example of the controller is controller 1008 of FIG. 10. In various embodiments, the controller executes instructions for processing contents of chamber 930. In some embodiments, the instructions are obtained from reading an electronic tag of the chamber 930 via the electronic tag reader 906. In some embodiments, the controller requests instructions from a remote server based on the contents. The controller controls the EM source 902 to implement heating levels and patterns, e.g., activating the electromagnet to carry out the heating instructions.

In some embodiments, the apparatus includes one or more network interfaces (not shown). A network interface allows controller 908 to be coupled to another computer, computer network, or telecommunications network using a network connection as shown. For example, through the network interface, the controller 908 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) controller 908 can be used to connect the heating apparatus 900 to an external network and transfer data according to standard protocols. For example, various process embodiments disclosed herein can be executed on controller 908, or can be performed across a network such as the Internet, intranet networks, or local area networks, in conjunction with a remote processor that shares a portion of the processing. Additional mass storage devices (not shown) can also be connected to controller 908 through the network interface.

In some embodiments, the apparatus includes one or more I/O devices 910. An I/O device interface can be used in conjunction with heating apparatus 900. The I/O device interface can include general and customized interfaces that allow the controller 908 to send and receive data from other devices such as sensors, microphones, touch-sensitive displays, transducer card readers, tape readers, voice or handwriting recognizers, biometrics readers, cameras, portable mass storage devices, and other computers.

The user interface 910 is configured to receive user input and/or provide information to a user. For example, the user interface may be suitable for receiving user input at 604 of FIG. 6. In various embodiments, the user interface 910 is a touch-sensitive screen. For example, various options for food preparation may be displayed on the touch screen. The user interface may transmit a user's selection to a processor such as controller 908. The processor then determines a heating schedule based at least in part on the user selection.

In various embodiments, controller 908 is coupled bi-directionally with memory (not shown), which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on controller 908. Also as is well known in the art, primary storage typically includes basic operating instructions, program code, data and objects used by the controller 908 to perform its functions (e.g., programmed instructions). For example, memory can include any suitable computer-readable storage media, described below, depending on whether, for example, data access needs to be bi-directional or uni-directional. For example, controller 908 can also directly and very rapidly retrieve and store frequently needed data in a cache memory (not shown).

In some embodiments, the controller implements the heating instructions based on sensor readings. The controller may determine that a heating stage is complete, e.g., the food has reached a desired state, based on sensor readings. For example, when a level of moisture inside the chamber 930 drops below a threshold, a Maillard reaction begins and the food becomes browned. The Maillard reaction may be indicated by a characteristic sound (e.g., sizzling). For example, in various embodiments, the controller determines a characteristic of the food being prepared using signals collected by the sensor(s) 904. The controller receives a sensor reading from the microphone and/or other sensors and determines that the Maillard reaction has begun based on the sensor reading meeting a threshold or matching a profile. For example, the color of food may indicate whether the food has been cooked to satisfaction. The controller receives a sensor reading from the camera and/or other sensors and determines that food has been cooked to a desired level of tenderness based on the sensor reading meeting a threshold or matching a profile.

The controller may adjust a heating stage or a heating power level based on sensor readings. For example, in various embodiments at the end of a default heating time indicated by heating instructions, the controller checks sensor readings. The sensor readings indicate that the food is not sufficiently browned. The controller may then extend the heating time such that the food is more browned.

In various embodiments, the heating apparatus includes a cradle or support for apparatus 100. For example, the support may be separated from the heating apparatus, the apparatus 100 inserted into the support, and the support returned to the heating apparatus. The support may support a circumference/walls of apparatus 100.

In various embodiments, the heating apparatus includes a switch (not shown). The switch may power on the heating apparatus and/or receive user input to begin a heating process. In various embodiments, the switch is provided with a visual indicator of progress of a heating process. For example, the switch may be provided at the center of a light "bulb," where the light bulb includes one or more colored lights (e.g., LED lights). The light "bulb" may change colors during the heating process, acting like a timer. For example, at the beginning of a heating process, the bulb is entirely be red. As the heating process progresses, the light gradually turns green (e.g., segment by segment) until the light is entirely green, indicating completion of a heating stage or heating process. The light may gradually turn green segment by segment as if with the sweeping of a second hand of a clock, where a section to the left of the hour and minutes hands is red and a section to the right of the hour and minute hands is green until both hands are at 12:00 and the bulb is entirely green.

In various embodiments, the heating apparatus may include a user interface to display and/or receive user input. For example, a current power/energy level of a heating phase may be displayed on the user interface. In some embodiments, the energy levels are categorized Level 1 to Level 6 and a current power level of a heating phase is displayed on the user interface. The categorization may facilitate user comprehension of the energy level. Power/energy levels may be represented in an analog or continuous manner in some embodiments.

The heating apparatus 900 may be a variety of shapes. For example, heating apparatus 900 may be around 9 inches in diameter and around 2 inches in height. In some embodiments, the shape of the apparatus is compatible with an apparatus such as chamber 800 of FIG. 8. For example, the apparatus may be of a suitable surface area and shape to heat the contents of chamber 800.

Figure 10:
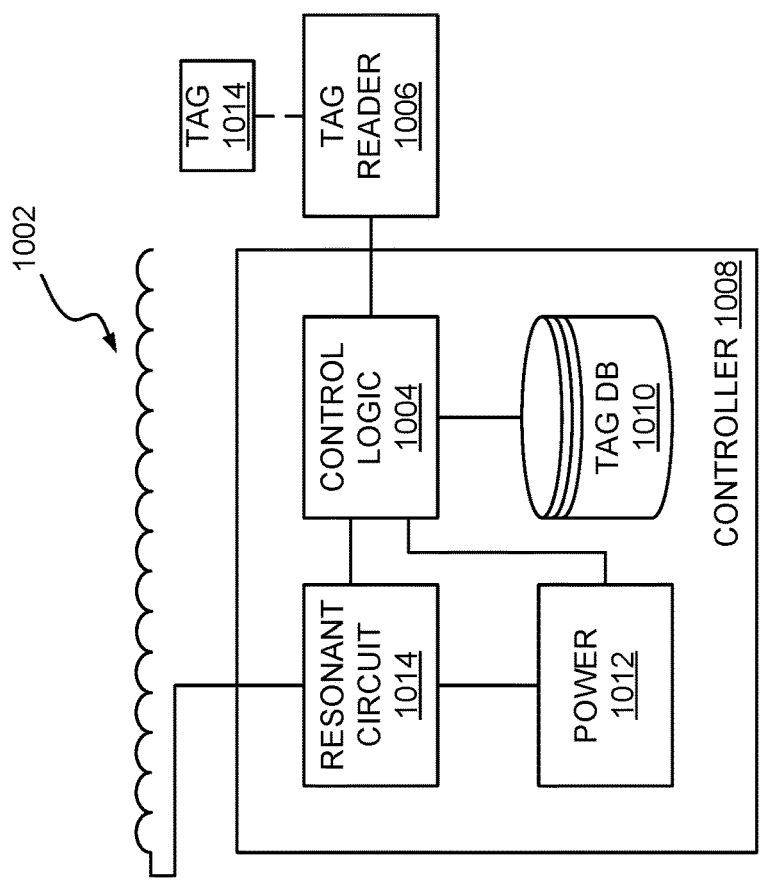
FIG. 10 is a block diagram of an embodiment of a controller for a heating apparatus.

FIG. 10 is a block diagram of an embodiment of a controller 1008 for a heating apparatus. For example, the controller may be provided in heating apparatus 900 of FIG. 9. The controller 1008 includes control logic 1004, a tag database 1010, resonant circuit 1014, and power 1012. In this example, the controller 1008 is communicatively coupled to EM source 1002 and tag reader 1006.

The tag reader 1006 reads a tag 1014. The tag 1014 may encode information about packaged food. An example of tag reader 1006 is electronic tag reader 906 of FIG. 9.

The control logic 1004 is configured to receive tag information from the tag reader 1006 and determine one or more heating cycles based on the tag information. In some embodiments, the control determines heating cycle(s) by looking up an association between the tag information and stored heating cycles. For example, the control logic may determine heating cycle(s) adapted to properties of a chamber in which the heatable load is provided and/or characteristics of the heatable load. In various embodiments, the control logic executes one or more processes described herein including the processes of FIGS. 2, 6, and 11.

In some embodiments, the control logic is implemented by one or more processors (also referred to as a microprocessor subsystem or a central processing unit (CPU)). For example, the control logic 1004 can be implemented by a single-chip processor or by multiple processors. In some embodiments, processor 1004 is a general purpose digital processor that controls the operation of the heating apparatus 900. Using instructions retrieved from memory, the processor 1004 controls the reception and manipulation of input data, and the output and display of data on output devices (e.g., display 118 of FIG. 1 or user interface 910 of FIG. 9).

The tag database 1010 stores associations between heatable loads and heating cycles. For example, energy level, duration, and other properties of heating cycles may be stored for loads or characteristics of matter to be heated. In various embodiments, the associations are pre-defined and loaded into the database. In various embodiments, the associations are refined based on machine learning, user feedback, and/or sensor readings of heatable load properties before, during, or after a heating cycle. Although shown as part of the controller 1008, the tag database may instead be external to the controller.

The resonant circuit 1014 controls the EM source 1002. In various embodiments, the resonant circuit 1014 has an integrated EM source 1002, e.g., an inductor coil. In various embodiments, the EM source is a separate element from the resonant circuit 1014.

The power 1012 is input to the resonant circuit 1014. In various embodiments, the power 1012 is a DC source. The DC source may be an internal or external DC source or may be an adapter for an external AC source. Although shown as an internal source, the power may instead be external to the controller 1008.

In operation, tag reader 1006 readings tag information from tag 1014, sends the information to the control logic 1004. The control logic 1004 maps the received tag information to one or more heating cycles using associations stored in tag database 1010. The control logic 1004 then instructs the resonant circuit 1014 to execute the heating cycles. For example, the control logic 1004 may also control when power 1012 is provided to the resonant circuit 1014. Resonant circuit 1014 then activates the EM source 1002.

Figure 11:
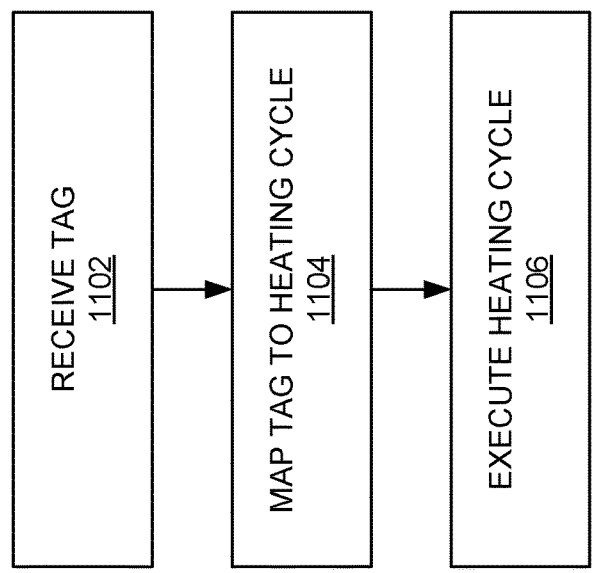
FIG. 11 is a flowchart illustrating an embodiment of a process to operate an automatic cooking system.

FIG. 11 is a flowchart illustrating an embodiment of a process 1100 to operate an automatic cooking system. In various embodiments, the process 1100 may be implemented by a processor such as control logic 1004 of FIG. 10.

A tag is received (1102). In various embodiments, the tag is an electronic tag associated with a heatable load. Tag 824 of FIG. 8 is an example of a tag encoding information about matter 1100. The tag is mapped to a heating cycle (1104). In various embodiments, the tag is mapped by looking up an association between the tag and heating cycles. The heating cycles may be adapted for characteristics of a heatable load. The heating cycle may be defined by a duration and an energy as further described herein. Upon determination of one or more heating cycles, the heating cycle(s) is executed (1106). For example, in various embodiments control logic instructs a resonant circuit to drive an EM source.

FIG. 12A is a block diagram illustrating an embodiment of a modular cooking system 1200. The system 1200 includes a plurality of sub-units (labelled as "devices"). In this example, the sub-units of the system are heating apparatus, e.g., N heating apparatus. In various embodiments, the sub-units are communicatively coupled to at least their adjacent sub-units. For example, the sub-units may communicate by wired or wireless means such as Bluetooth®, Wi-Fi®, and/or other local area network protocols. For example, in various embodiments, the sub-units each have a network interface such as the network interface described with respect to FIG. 2.

The sub-units may be configured to coordinate operation such that the system operates as a single unit. For example, one of the sub-units may be appointed as a master and communicate with the other slave sub-units of the system. If the master is removed from the system, another sub-unit may be appointed as the master. As another example, each of the sub-units may be instructed to operate (e.g., delay beginning of cook time) by a central server.

The system 1200 is expandable and accommodates sub-units that may be added or removed after an initial set-up. For example, the heating apparatus need not be acquired at the same time. When a heating apparatus is added to the system, the heating apparatus is automatically configured to communicate and coordinate with the other heating apparatus as further described herein with respect to FIGS. 12A and 12B. When a heating apparatus is removed from the system, the system is automatically updated.

In various embodiments, one or more sub-units of system 1200 are configured to coordinate meal preparation. For example, the heating apparatus may be configured to finish cooking at the same time. Those heating apparatus with contents having shorter heating times may delay the start time such that the heating apparatus finish at the same time. Suppose Device 1 is instructed to cook steak, which takes 3 minutes to cook, Device 2 is instructed to cook spinach, which takes 1 minute to cook, and Device N is instructed to cook mashed potatoes, which takes 2.5 minutes to cook. Device 1 begins first, 1.5 minutes later, Device N begins, and 30 seconds after Device N begins, Device 2 begins. Thus, Devices 1, 2, and N will finish heating at the same time.

As another example, the devices may be configured to finish heating at staggered times. Using the same example in which Device 1 is instructed to cook steak, which takes 3 minutes to cook, Device 2 is instructed to cook spinach, which takes 1 minute to cook, and Device N is instructed to cook mashed potatoes, which takes 2.5 minutes to cook, suppose mashed potatoes need more time to cool down. Devices 1 and 2 may be configured to finish at the same time, and Device N may be configured to finish 1 minute before Devices 1 and 2. Device 2 is instructed to cook spinach, which takes 1 minute to cook, and Device N is instructed to cook mashed potatoes, which takes 2.5 minutes to cook. Device 1 begins first, 0.5 minutes later, Device N begins, and 1.5 minutes after Device N begins, Device 2 begins. Thus, Devices 1 and 2 will finish heating at the same time (3 minutes after Device 1 began) and Device N will finish heating 1 minute before Devices 1 and 2 are finished.

Figure 12B:
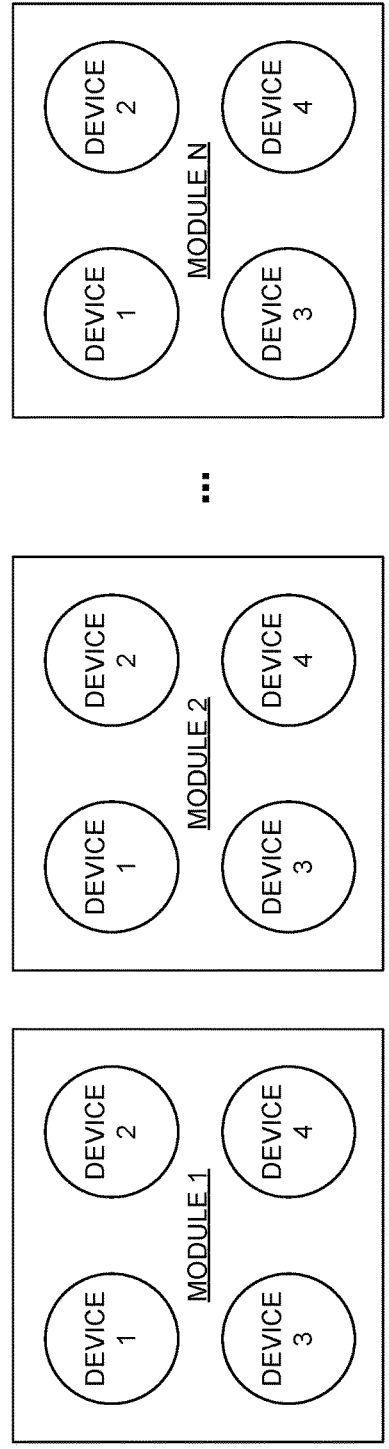
FIG. 12B is a block diagram illustrating an embodiment of a modular cooking system.

FIG. 12B is a block diagram illustrating an embodiment of a modular cooking system 1250. The system 1250 includes a plurality of sub-units (labelled as "devices"). In this example, the sub-units of the system are modules, e.g., N modules. Each of the modules includes four heating apparatus, Device 1 to Device 4. In various embodiments, the sub-units are communicatively coupled to at least their adjacent sub-units. For example, the sub-units may communicate by wired or wireless means such as Bluetooth®, Wi-Fi®, and/or other local area network protocols. For example, in various embodiments, the sub-units each have a network interface such as the network interface described with respect to FIG. 2.

In various embodiments, the modules may be configured to coordinate operation of constituent heating apparatus. For examples, Device 1 to Device 4 are configured to finish heating at the same time or pre-defined staggered finish times. In various embodiments, the modules may be configured to coordinate operation with each other. For example, Modules 1 to N are coordinated to finish heating at the same time or pre-defined staggered finish times.

Suppose system 1250 is preparing a meal for two people, where each meal includes four courses. Each of the courses may be packaged in a chamber such as apparatus 100 of FIG. 1. In some embodiments, the chambers may be loaded into the devices at the same time and configured to be finished heating at pre-defined times (e.g., at the same time or pre-selected staggered times.

There are a variety of ways to load the chambers into the devices/modules. In a first example, each of the courses for the first person is inserted into a respective device in Module 1. Each of the courses for the second person is inserted into a respective device in Module 2. For example, Device 1 in each module receives a package for a starter, Device 2 in each module receives a package for an intermediate course, Device 3 in each module receives a package for a main course, and Device 4 in each module receives a package for a dessert. The packages may all be inserted into the heating apparatus at the same time. In a second example, courses of the same type are inserted into the same module. For example, a starter package is inserted into Device 1 and Device 2 of Module 1, an intermediate course package is inserted into Device 3 and Device 4 of Module 1, a main course package is inserted into Device 1 and Device 2 of Module 2, and a dessert package is inserted into Device 3 and Device 4 of Module 2.

In operation, the modules may coordinate to finish cooking the starter first, finish cooking the intermediate course 10 minutes after cooking of the starter is completed, finish cooking the main course 15 minutes after cooking of the intermediate course is completed, and finish cooking the dessert 20 minutes after cooking of the main course is completed. The modules may factor in the time is takes to prepare each of the courses in determining when to begin cooking each of the courses to meet the defined finish time.

Although the foregoing embodiments have been described in some detail for purposes of clarity of understanding, the invention is not limited to the details provided. There are many alternative ways of implementing the invention. The disclosed embodiments are illustrative and not restrictive.

The invention claimed is:

1. A method comprising:
   using a tag reader to read heating instruction data encoded in an electronic tag;
   determining, by a processor, heating phases based on the read heating instruction data;
   automatically controlling a heating apparatus to execute the determined heating phases, wherein the heating apparatus includes a plurality of cooking devices each configured to execute heating phases; and
   executing a heating phase of the determined heating phases such that the heating phase terminates in a coordinated manner with respect to a heating phase executed by at least one other heating apparatus, wherein a heating phase executed by a first cooking device terminates in a coordinated manner with a heating phase executed by a second cooking device.

2. The method of claim 1, wherein the heating apparatus includes an electromagnetic source.

3. The method of claim 1, wherein the reading the heating instruction data includes scanning the electronic tag.

4. The method of claim 1, wherein the electronic tag is an RFID tag.

5. The method of claim 1, wherein the heating instruction data includes a link to instructions stored in a remote server.

6. The method of claim 1, wherein the determined heating phases include at least one of: a number phases, a duration of each of the phases, and an energy level of each of the phases.

7. The method of claim 1, further comprising executing the determined heating phases in a manner determined to cause the heating apparatus and the at least one other heating apparatus to complete cooking at substantially the same time.

8. The method of claim 1, further comprising executing the determined heating phases in a manner determined to cause the heating apparatus and the at least one other heating apparatus to complete cooking at pre-defined different times.

9. The method of claim 1, further comprising:
   receiving user input during a cooking process; and
   modifying the determined heating phases based on the received user input.

10. The method of claim 1, further comprising:
    receiving user input during a cooking process; and
    delaying one of the determined heating phases based on the received user input.

11. A system comprising:
    a tag reader configured to read heating instruction data encoded in an electronic tag;
    a processor configured to:
      determine heating phases based on the read heating instruction data;
      automatically control a heating apparatus to execute the determined heating phases, wherein the heating apparatus includes a plurality of cooking devices each configured to execute heating phases; and
      execute a heating phase of the determined heating phases such that the heating phase terminates in a coordinated manner with respect to a heating phase executed by at least one other heating apparatus, wherein a heating phase executed by a first cooking device terminates in a coordinated manner with a heating phase executed by a second cooking device; and
    a memory coupled to the processor and configured to provide the processor with instructions.

12. The system of claim 11, wherein the determined heating phases include at least one of: a number phases, a duration of each of the phases, and an energy level of each of the phases.

13. The system of claim 11, wherein the processor is further configured to execute the determined heating phases in a manner determined to coordinate with at least one other heating apparatus.

14. The system of claim 13, wherein the execution of the determined heating phases includes execution in a manner determined to cause the heating apparatus and the at least one other heating apparatus to complete cooking at substantially the same time.

15. The system of claim 13, wherein the execution of the determined heating phases includes execution in a manner determined to cause the heating apparatus and the at least one other heating apparatus to complete cooking at pre-defined different times.

16. A computer program product, the computer program product being embodied in a non-transitory computer readable storage medium and comprising computer instructions for:
  using a tag reader to read heating instruction data encoded in an electronic tag;
  determining, by a processor, heating phases based on the read heating instruction data;
  automatically controlling a heating apparatus to execute the determined heating phases, wherein the heating apparatus includes a plurality of cooking devices each configured to execute heating phases; and
  executing a heating phase of the determined heating phases such that the heating phase terminates in a coordinated manner with respect to a heating phase executed by at least one other heating apparatus, wherein a heating phase executed by a first cooking device terminates in a coordinated manner with a heating phase executed by a second cooking device.

17. The computer program product of claim 16, wherein the determined heating phases include at least one of: a number phases, a duration of each of the phases, and an energy level of each of the phases.

18. The computer program product of claim 16, further comprising instructions to execute the determined heating phases in a manner determined to coordinate with at least one other heating apparatus.

19. The computer program product of claim 18, wherein the execution of the determined heating phases includes execution in a manner determined to cause the heating apparatus and the at least one other heating apparatus to complete cooking at substantially the same time.

\* \* \* \* \*